United States Patent [19]

Wheeler

[11] Patent Number: 5,017,952
[45] Date of Patent: May 21, 1991

[54] COMBINATION CAMERA TO PRODUCE MULTIPLE PRINTS, AND PRINT VIEWING DEVICE

[76] Inventor: Douglas E. Wheeler, 1715 Enclave Pky., Apt. 307, Houston, Tex. 77077

[21] Appl. No.: 478,454

[22] Filed: Feb. 12, 1990

[51] Int. Cl.⁵ .............................................. G03B 29/00
[52] U.S. Cl. ........................................ 354/76; 350/134
[58] Field of Search .................... 354/75, 76; 350/133, 350/134, 141; 352/138, 129, 121

[56] References Cited

U.S. PATENT DOCUMENTS 1,957,043 5/1934 Harlow ............................... 350/134

Primary Examiner—L. T. Hix
Assistant Examiner—Howard B. Blankenship
Attorney, Agent, or Firm—William W. Haefliger

[57] ABSTRACT

A combination camera to produce a print or prints from film, and print viewing device comprising a housing, and multiple light paths in the housing; a film receiving zone associated with the housing; a print receiving zone associated with the housing; a viewing channel associated with the housing; and mirror means in the housing to reflect light received from an object to pass via one of the light paths to the film at the film receiving zone for exposing the film, and to reflect light from an illuminated print at the print receiving zone to pass via another of the light paths for viewing, via the viewing channel.

22 Claims, 3 Drawing Sheets

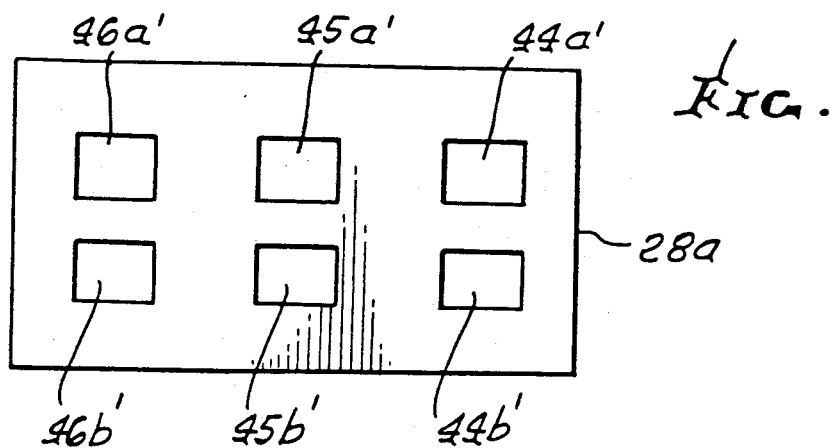
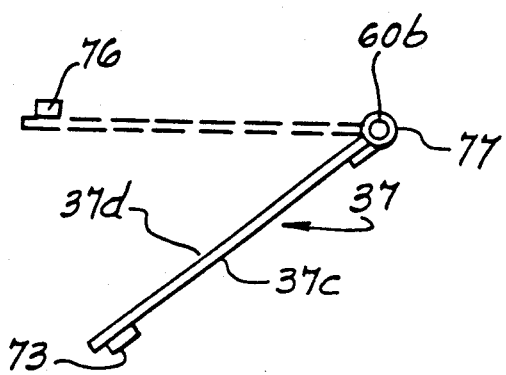
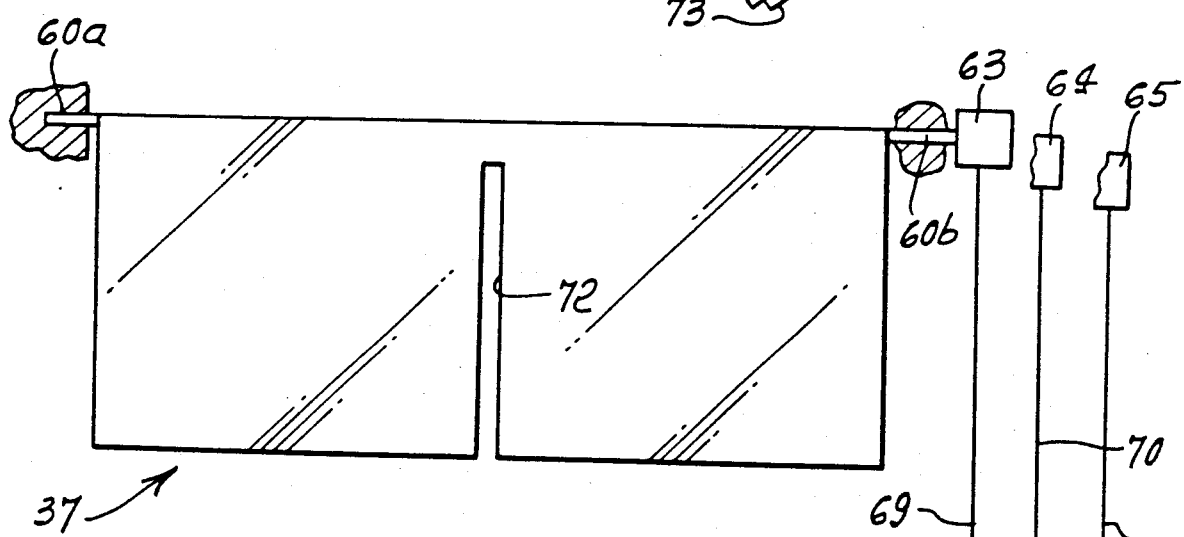
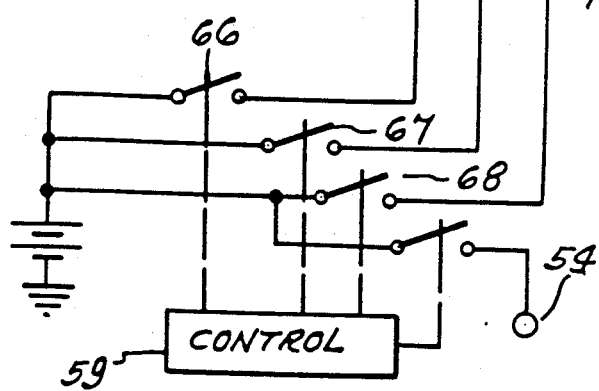

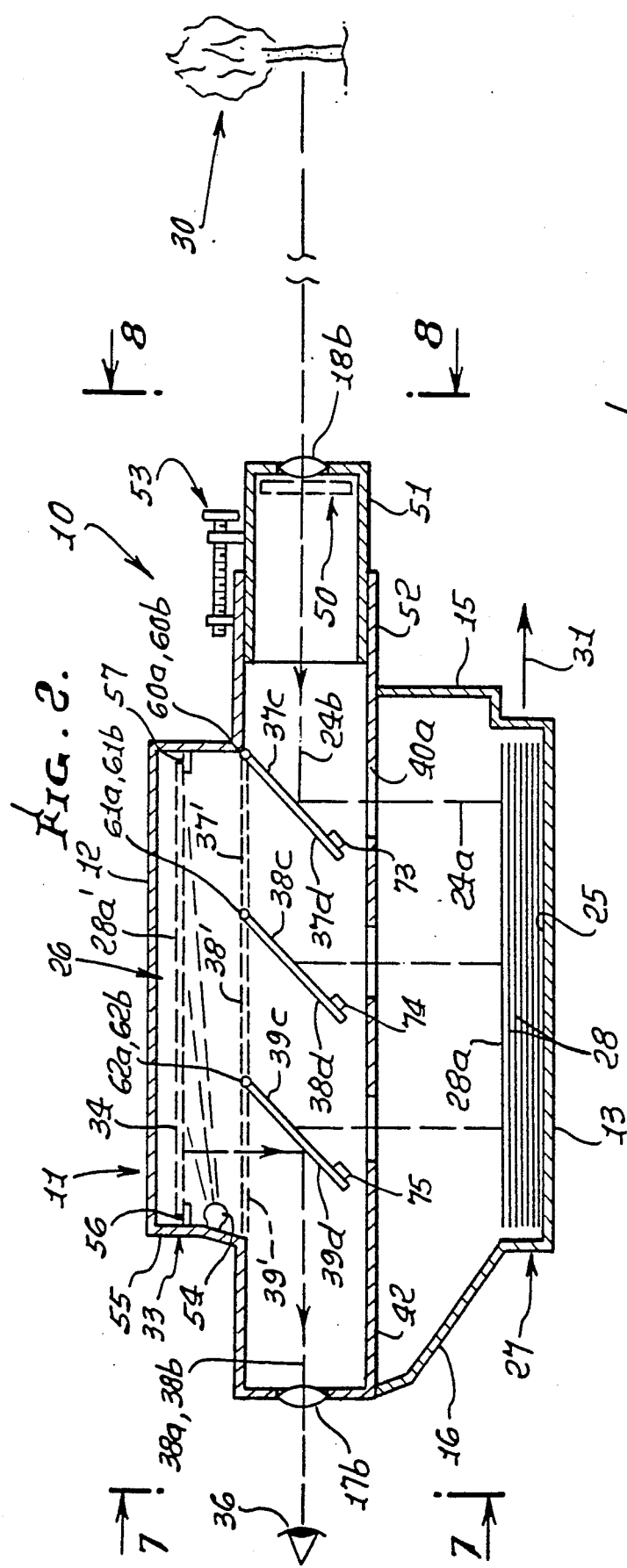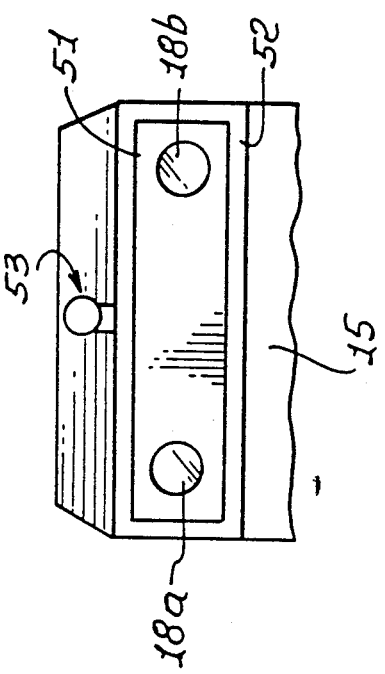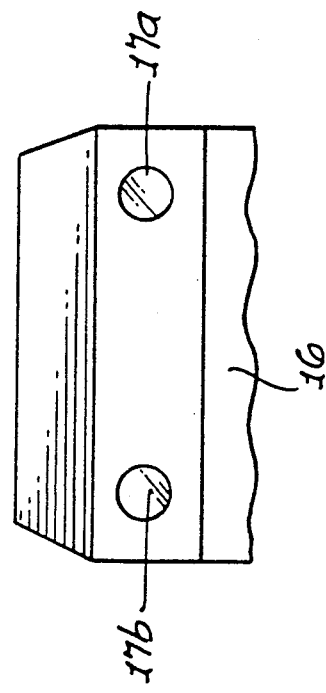

COMBINATION CAMERA TO PRODUCE MULTIPLE PRINTS, AND PRINT VIEWING DEVICE

BACKGROUND OF THE INVENTION

This invention relates generally to devices for both producing prints as from film exposed upon sighting the device toward an object, and for later viewing the print by viewing into the same device.

A device of the type referred to is contemplated to have great utility, one reason being that the viewer looking into the device to view a print may see the same object that he saw when originally sighting the device to produce the print. This effect is contemplated to be greatly enhanced if the object can be viewed stereoscopically, and if timewise spaced views can be produced, controllably.

SUMMARY OF THE INVENTION

It is a major object of the invention to provide a device capable of operating in the manner as contemplated above, with great utility. Such a device basically comprises:
- (a) a housing, and multiple light paths in the housing,
- (b) a film receiving zone associated with the housing,
- (c) a print receiving zone associated with the housing,
- (d) a viewing channel associated with the housing,
- (e) and mirror means in the housing to reflect light received from an object to pass via one said light path to film at the film zone for exposing the film, and to reflect light from an illuminated print at the print receiving zone to pass via another said light path for viewing, via said viewing channel.

As will be seen, the mirror means may typically comprise multiple mirrors arrayed in a sequence for reflecting light from the object to different portions of the film; and such mirrors are typically planar and extend in substantially parallel, spaced apart relation whereby light reflected from the mirrors passes via different generally parallel said light paths to said different portions of the film. Further, means is provided to mount at least one of said mirrors to be controllably shifted into and out of said one light path.

It is another object to provide at least three of said mirrors, and including pivots to pivot at least two of said mirrors as they are displaced by a drive means; and the drive means typically includes a control for sequentially pivotally displacing said two mirrors in predetermined time relation. In this regard, the device is typically constructed so that upon shifting or pivoting of the mirror or mirrors, the one light path merges with the other light path, allowing initial viewing of said object via an extended light path through the device.

It is yet another object to provide the viewing channel to extend substantially horizontally forwardly relative to the housing, with said print receiving zone spaced above said channel and the mirror means, and said film receiving zone is spaced below said channel and the mirror means.

For stereoscopic use, the device is constructed so that one light path extends horizontally and includes two parallel sections which are laterally spaced apart, and said viewing channel extends longitudinally and includes two parallel sections respectively in alignment with said two sections of the one light path.

Use of the device, as referred to, includes the steps:
- ($x_1$) transmitting light from an object or objects to pass via one light path and the mirror means to film at the film zone for exposing said film,
- ($x_2$) deriving a print from the exposed film,
- ($x_3$) placing the derived print at the print receiving zone, and
- ($x_4$) transmitting light from the print at the print receiving zone via said mirror means and said viewing channel for viewing.

In this regard, the one light path may have two longitudinally parallel, laterally spaced sections, so that two offset images of the object or objects are produced on the film and on the print; and the viewing channel may have two laterally spaced, parallel sections, and said transmitting of light from the print includes transmitting light from the two offset images via the respective parallel sections of the viewing channel, whereby a stereoscopically viewable reproduction of the object or objects is produced. In addition, the method includes shifting the mirror means out of said one light path, and initially viewing the object or objects via said viewing channel and said one light path. Where the mirror means includes multiple mirrors, the method may then include the step of sequentially shifting at least two of said mirrors out of said one light path, whereby two stereoscopically viewable pairs of offset images of the object or objects are produced on the film and on the print, the two pairs of images thereby offset in time.

These and other objects and advantages of the invention, as well as the details of an illustrative embodiment, will be more fully understood from the following specification and drawings, in which:

DRAWING DESCRIPTION

FIG. 2 is a schematic side view, in elevation, of apparatus incorporating the invention;

FIG. 4 is a plan view of a film having three pairs of exposed zones;

FIG. 5 is a schematic end view of a mirror, and stops to limit mirror movement; and FIG. 6 is a front view of the mirror taken on lines 6—6 of FIG. 5, and a mirror drive and control therefore.

DETAILED DESCRIPTION

Figure 1:
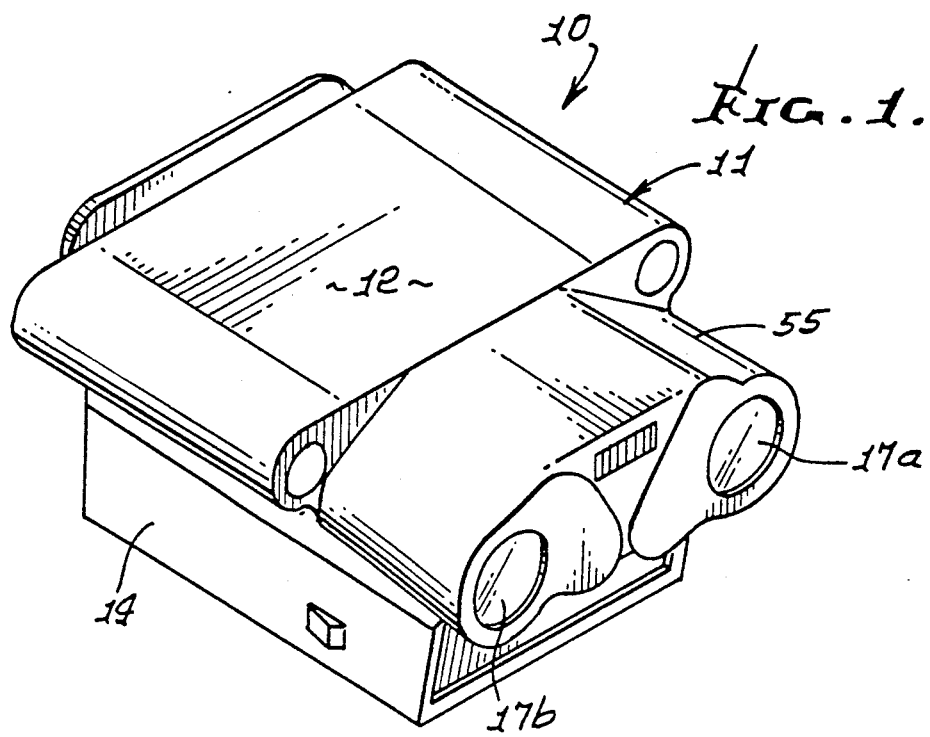
FIG. 1 is a perspective view of apparatus incorporating the invention.
Figure 3:
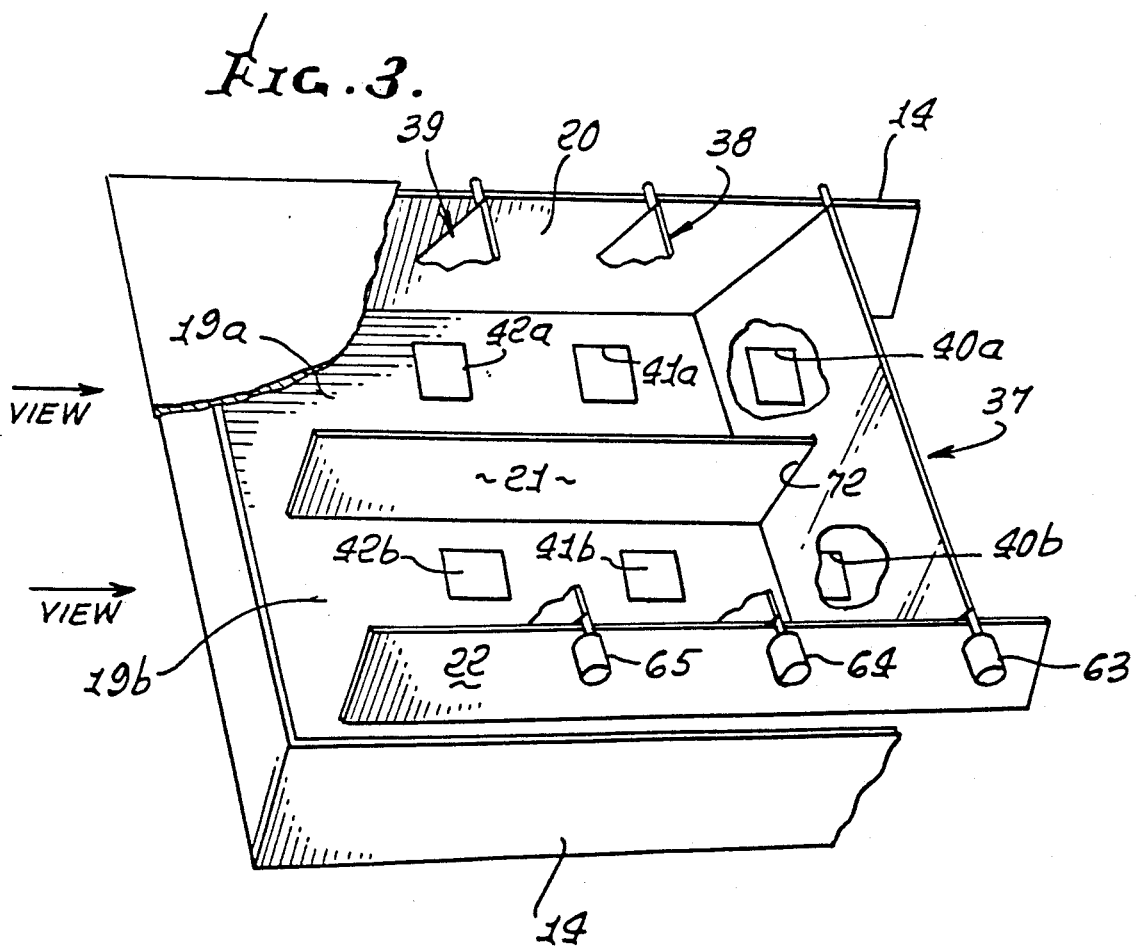
FIG. 3 is a perspective view of a mirror system employed in the FIG. 2 apparatus.

In FIGS. 1 to 3, an apparatus 10 is a combination camera to produce a print or prints, and print viewing device. It includes a housing 11 having top and bottom walls 12 and 13, opposite side walls 14, and front and rear end walls 15 and 16. The apparatus is oriented in the general manner of a binoculars, with a rear eyepiece lens or lenses 17a and 17b, and a front objective lens or lenses 18a and 18b. Between these front and rear lenses is a viewing channel, typically including two sections 19a and 19b. Section 19a is in front to rear horizontal alignment with lenses 17a and 18a, and section 19b is in front to rear horizontal alignment with lenses 17b and 18b. The two sections 19a and 19b extend in parallel, laterally offset relation. Lenses 17a and 17b are also offset laterally, as are lenses 18a and 18b. Accordingly, the viewing channel including its two sections are located in the housing and are associated therewith.

FIG. 3 shows channel section 19a located between upright walls 20 and 21, and section 19b located between upright walls 21 and 22. Those walls may typically extend throughout the major forward to rearward extent of the housing.

Referring again to FIG. 3, the housing contains multiple light paths, as at 24a and 24b for example in the forward extents of the channel sections 19a and 19b respectively. Also, a film receiving zone 25 is associated with the housing, as for example directly beneath the channel sections 19a and 19b; and a film print receiving zone 26 is associated with the housing, as for example directly above the channel sections 19a and 19b.

Zone 25 is formed by a box-like structure 27 containing a stack of unexposed film sheets 28, a POLAROID film pack being an example. Another example is the stack of film sheets and the enclosure therefore disclosed in U.S. Pat. No. 4,717,930. The top sheet 28a of film in the pack extends in a horizontal plane, facing upwardly to receive impingement of light from an object 30, seen in FIG. 2. Successive top sheets of film, when exposed, are ejected as in direction 31, as for example automatically by an ejection mechanism. Rectangular openings 40a, 40b, 41a, 41b, and 42a and 42b in bottom wall 42 above zone 25 pass light to film sheet 28a, from mirrors described below.

Zone 26 is also formed by a box-like structure 33, opening downwardly. Prints, as for example are indicated at 34 in FIG. 4, and which comprise developed film sheets, are inserted into the zone 26, so that the underside of the inserted print is illuminated by a light source 54, whereby light from the print is transmitted to the viewer's eyes 36, as via the mirror means.

Such a mirror means, as for example is represented by the three planar mirror panels 37–39, is located in the housing to reflect light received from the object 30 to pass via one light path (i.e. path sections 24a and 24b) to the film at the film zone 25 for exposing the film; and also to reflect light from the illuminated print at the print receiving zone 26 to pass via another light path (see path sections 38a and 38b) for viewing, via the viewing channel. For this purpose, each panel has mirrored surfaces at its opposite sides as indicated at 37c and 37d, 38c and 38d, and 39c and 39d. Thus, in the position seen in FIG. 2, light from object 30 passes through lenses 18a and 18b via one light path (i.e. sections 24a and 24b) to impinge a mirror surface 37c; and that light is reflected downwardly via openings 40a and 40b to impinge on film sheet 28a to expose two rectangular film zones 44a and 44b, seen in FIG. 4.

These zones are laterally offset so that upon development into corresponding prints, and viewing when the print sheet 28a' is placed in zone 26 of the device, and illuminated, the light from print zones 44a' and 44b' is transmitted downwardly to the rear surface 37d of mirror panel 37, and then reflected rearwardly in channel sections 19a and 19b, and through eyepiece lenses 17a and 17b, for viewing, as in a binoculars. During this latter "viewing" phase, mirror panels 38 and 39 are pivoted upwardly to broken line positions seen at 38' and 39' in FIG. 2. The viewer thereby obtains a stereoptical view of the object 30, in the same manner that he saw it initially, with all three inner panels pivoted upwardly (to positions 37', 38' and 39'), so that light from the object 30 could travel straight through the device via lenses 18a and 18b, the channel sections 19a and 19b, and lenses 17a and 17b.

In like manner when mirror panel 37 is swung upwardly, and panel 38 is "down", in the position seen in FIG. 2, light is reflected to film zones 45a and 45b, to expose same; and when mirror panels 37 and 38 are elevated, panel 39 is "down", in FIG. 2 position, light from object 30 is reflected to film zones 46a and 46b. Therefore, if the object 30 is moving, and the mirror panels 37, 38 and 39 are operated in close timewise sequence to expose film zones 44a and 44b at time $t_1$, film zones 45a and 45b, at time $t_2$, and film zones 46a and 46b at time $t_3$, where $t_2$ closely follows $t_1$, and $t_3$ closely follows $t_2$, a sequence of stereoscopically viewable prints is obtained in the film sheet 28a; additionally, when the developed prints are inserted into the print receiving zone 26, on sheet 28a, and the mirrors again adjusted to pass light to the viewer's eye at three times $t_1'$, $t_2'$ and $t_3'$, where $t_2'$ closely follows $t_1'$, and $t_3'$ closely follows $t_2'$, the viewer obtains a stereoscopic "readout", in timed sequence, of the moving object. Note that mirror panels 38 and 39 would be raised while "down" panel 37 operates to reflect light from the print zones 44a' and 44b'; mirror panel 39 would be raised while panel 38 would be moved down to reflect light from the print zones 45a' and 45b'; and mirror panel 39 would be moved down to reflect light from print zones 46a' and 46b'.

A suitable shutter mechanism to control light passage to the mirrors is indicated at 50, near lenses 18a and 18b; and a box-like rectangular carrier 51 for those lenses and shutter is adjustably movable toward and away from the mirrors, for focus, as in a binoculars. Sleeve portion 52 of the housing closely receives the carrier 51; and a threaded, thumb-wheel adjuster 53 is manipulable to effect the adjustment. It may be enclosed within the housing, if desired. A light 54 within housing portion 55 that forms zone 26, is positioned to illuminate the underside of the print sheet, in that zone. A control for the light appears at 59 in FIG. 6. Ledges to seat the print sheet appear at 56 and 57.

FIGS. 5 and 6 show schematically the means for controllably pivoting the mirrors. Note that each mirror panel is pivotally mounted as at 60a and 60b for panel 37, 61a and 61b for panel 38, and 62a and 62b for panel 39. Rotary drives (solenoids, for example) are seen at 63, 64 and 65, respectively for the three mirror panels. Control 59 controls switches 66, 67 and 68 in leads 69–71 from current source, to controllably rotate the mirrors in the modes and sequences, referred to above. Note that each mirror panel may form a central slot 72 to receive the wall 21, as is also clear from FIG. 3. Stops to limit mirror rotation to down position appear at 73–75. Stops to limit "up" rotation may be provided, as at 76 in FIG. 5. Mirror panel bearing coil springs 77 may be employed to yieldably retain the mirrors in up-position, until selectively displaced to down position as by the drives 63–65.

I claim:

1. In a combination camera to produce a print or prints from film, and print viewing device,
   (a) a housing, and multiple light paths in the housing,
   (b) a film receiving zone associated with the housing,
   (c) a print receiving zone associated with the housing,
   (d) a viewing channel associated with the housing,
   (e) and mirror means in the housing to reflect light received from an object to pass via one of said light paths to said film at the film receiving zone for exposing said film, and to reflect light from an illuminated print at the print receiving zone to pass via another of said light paths for viewing, via said viewing channel.

2. The device of claim 1 wherein said mirror means includes multiple mirrors arrayed in a sequence for reflecting light from the object to different portions of the said film.

3. The device of claim 2 wherein the mirrors are planar and extend in substantially parallel, spaced apart relation whereby light reflected from the mirrors passes via different generally parallel said light paths to said different portions of said film.

4. The device of claim 2 including means mounting at least one of said mirrors to be controllably shifted into and out of said one of said light paths.

5. The device of claim 2 including drive means operatively connected with at least one of the mirrors to controllably displace said one mirror into and out of said one of said light paths.

6. The device of claim 5 including a pivot to pivot said one mirror as it is displaced.

7. The device of claim 5 wherein there are at least three of said mirrors, and including pivots to pivot at least two of said mirrors as they are displaced by said drive means.

8. The device of claim 7 wherein said drive means includes a control for sequentially pivotally displacing said two mirrors in predetermined timed relation.

9. The device of claim 2 including means for shifting said mirror means so that said one of said light paths merges with said other of said light paths allowing initial viewing of said object via an extended light path through the device.

10. The device of claim 9 including an eyepiece lens associated with said viewing channel, and optics associated with the housing for passing light from the object to said one of said light paths.

11. The device of claim 10 wherein said optics includes image magnifying lens means.

12. The device of claim 9 wherein said viewing channel extends substantially horizontally forwardly relative to the housing, and said film receiving zone is spaced vertically from said channel.

13. The device of claim 9 wherein said viewing channel extends substantially horizontally forwardly relative to the housing, and said print receiving zone is spaced vertically from said channel.

14. The device of claim 9 wherein said viewing channel extends substantially horizontally forwardly relative to the housing, and said print receiving zone is spaced above said channel and the mirror means, and said film receiving zone is spaced below said channel and the mirror means.

15. The device of claim 1 wherein said one of said light paths extends horizontally and includes two parallel sections which are laterally spaced apart, and said viewing channel extends longitudinally and includes two parallel sections respectively in alignment with said two sections of said one of said light paths.

16. In steps of the process of photographic print production and print viewing, employing a device having:
(a) a housing, and multiple light paths in the housing,
(b) a film receiving zone associated with the housing,
(c) a print receiving zone associated with the housing,
(d) a viewing channel associated with the housing,
(e) and mirror means in the housing, the steps that include
($x_1$) transmitting light from an object or objects to pass via one of said paths and the mirror means to film at the film zone for exposing said film,
($x_2$) deriving a print from the exposed film,
($x_3$) placing the derived print at the print receiving zone, and
($x_4$) transmitting light from the print at the print receiving zone via said mirror means and said viewing channel for viewing.

17. The method of claim 16 wherein the film is rapid, self-developing film.

18. The method of claim 16 wherein said one of said light paths has two longitudinally parallel, laterally spaced sections, so that two offset images of the object or objects are produced on the film and on the print.

19. The method of claim 18 wherein said viewing channel has two laterally spaced, parallel sections, and said transmitting of light from the print includes transmitting light from the two offset images via the respective parallel sections of the viewing channel, whereby a stereoscopically viewable reproduction of the object or objects is produced.

20. The method of claim 16 including shifting said mirror means out of said one of said light paths, and initially viewing the object or objects via said viewing channel and said one of said light paths.

21. The method of claim 20 wherein said one of said light paths has two longitudinally parallel, laterally spaced sections, so that two offset images of the object or objects are produced on the film and on the print, said viewing channel having two laterally spaced sections, said viewing of the object or objects being effected via said two sections of the viewing channel and via said two sections of said one of said light paths.

22. The method of claim 19 wherein said mirror means includes multiple mirrors, and including the further step of sequentially shifting at least two of said mirrors out of said one of said light paths, whereby two stereoscopically viewable pairs of offset images of the object or objects are produced on the film and on the print, the two pairs of images thereby offset in time.

* * * * *